United States Patent [19]

D'Addio et al.

[11] 4,325,449
[45] Apr. 20, 1982

[54] ALL-TERRAIN MOTORCYCLE ATTACHMENT DEVICE

[76] Inventors: Robert S. D'Addio, 19 Leetes Island Rd., Branford, Conn. 06405; Douglas J. D'Addio, 119 Twin Lake Rd., North Branford, Conn. 06471

[21] Appl. No.: 134,294

[22] Filed: Mar. 27, 1980

[51] Int. Cl.$^3$ ............................................. B62K 13/04
[52] U.S. Cl. ..................................... 180/217; 180/210; 180/215; 280/282; 280/284
[58] Field of Search ............... 180/209, 210, 215, 216, 180/217; 280/281 R, 282, 283, 284

[56] References Cited

U.S. PATENT DOCUMENTS

| | | | |
|---|---|---|---|
| 1,933,102 | 10/1933 | Du Pont et al. | 180/210 |
| 3,298,713 | 1/1967 | Plain | 280/284 |
| 3,466,059 | 9/1969 | Kiernan | 280/282 |
| 3,650,344 | 3/1972 | Plessinger et al. | 180/217 |

Primary Examiner—Joseph F. Peters, Jr.
Assistant Examiner—Donn McGiehan

[57] ABSTRACT

An all-terrain motorcycle attachment device for attachment to a two-wheel motorcycle to convert the motorcycle to a three-wheel all-terrain vehicle is disclosed comprising a swingarm frame adapted for detachable connection to the swingarm pivot bolt assembly of a motorcycle, an axle rotatably mounted to the swingarm frame and supporting a pair of wheels, a drive sprocket connected to the axle, a brake assembly adapted for detachable connection to the brake rod of a motorcycle and a mount for detachably connecting the rear shock absorbers of a motorcycle to the swingarm frame. An alternate embodiment is also disclosed comprising a pair of spaced-apart support members, a length adjustable support brace interposed between the support members, fasteners for detachably connecting the support members and support brace to the swingarm assembly of a motorcycle, an axle rotatably mounted to the support members, a pair of wheels mounted to the axle, a drive sprocket connected to the axle, and a brake assembly adapted for detachable connection to the brake rod of a motorcycle.

29 Claims, 6 Drawing Figures

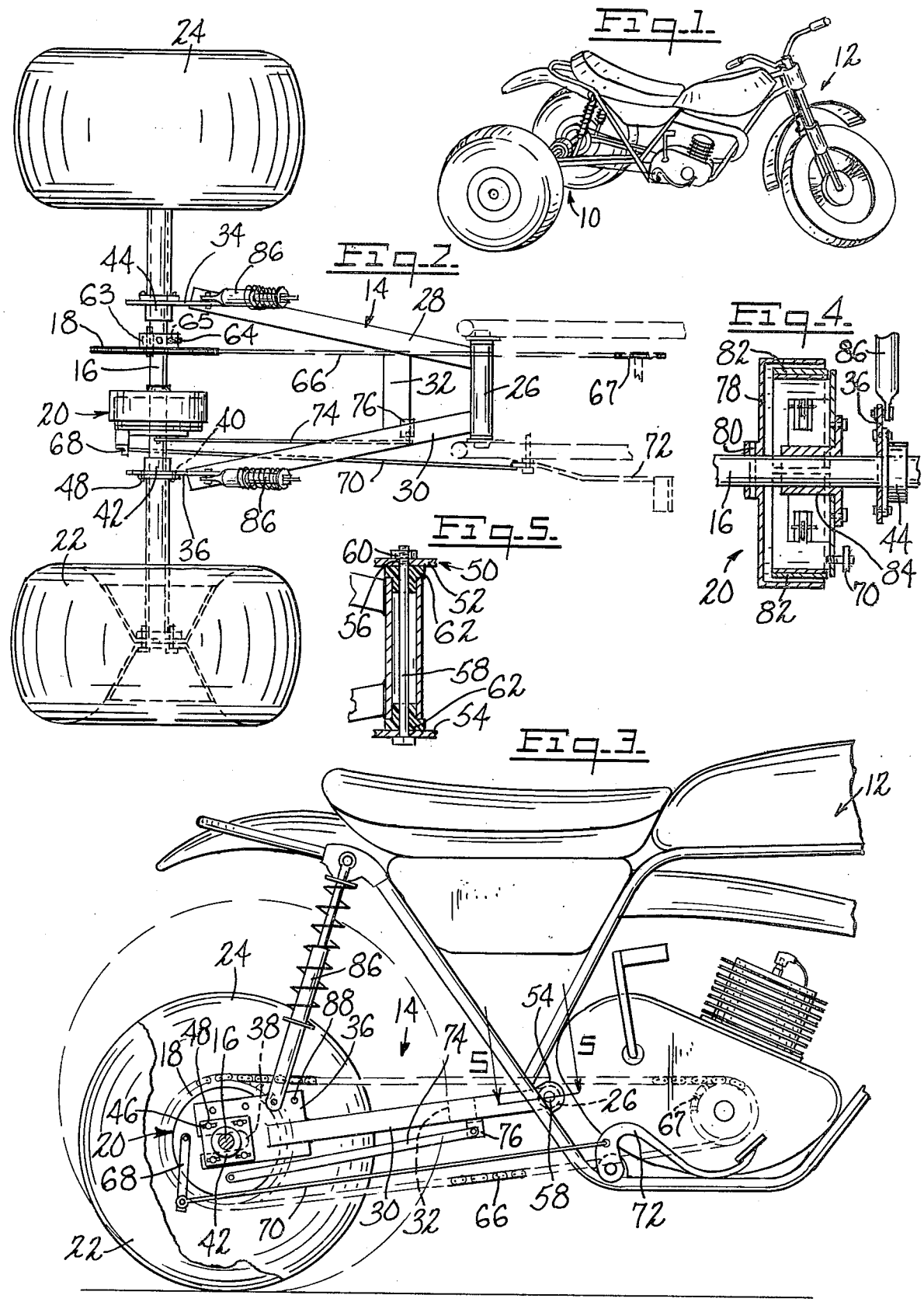

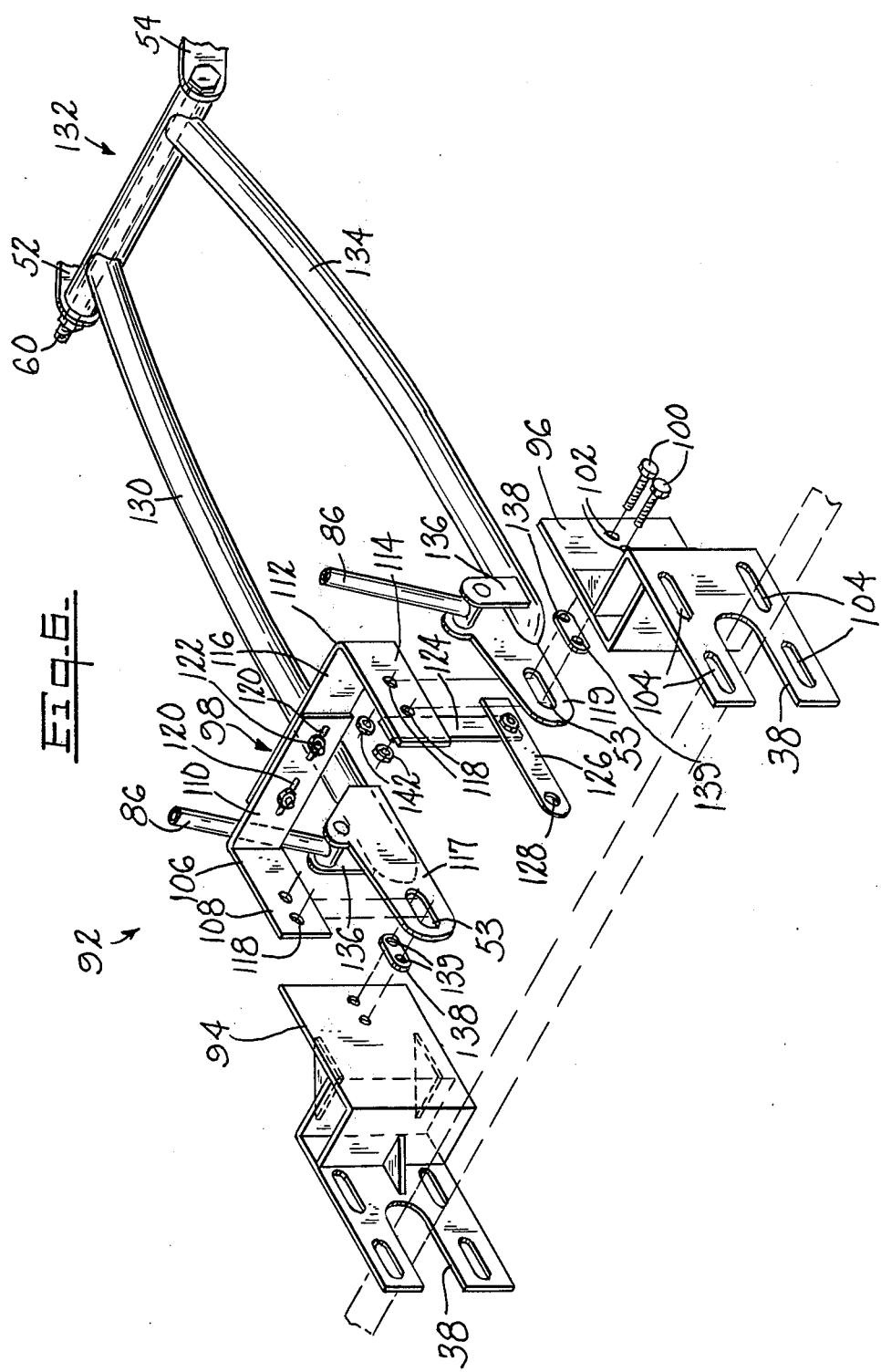

ALL-TERRAIN MOTORCYCLE ATTACHMENT DEVICE

BACKGROUND OF THE INVENTION

This invention relates to an attachment device for two-wheel motorcycles and more particularly to an all-terrain motorcycle attachment device to convert a motorcycle to a three-wheel all-terrain vehicle. Prior all-terrain vehicles encompass the purchase, maintenance, and storage of a completely separate vehicle in order to obtain such all-terrain performance.

SUMMARY OF THE INVENTION

An all-terrain motorcycle attachment device for converting a two-wheel motorcycle to a three-wheel all-terrain vehicle is disclosed comprising a swingarm frame having forward and rearward ends with the forward end being adapted for detachable connection to the swingarm pivot bolt assembly of a motorcycle and the rearward end supporting a rotatably mounted axle and all-terrain wheels, a drive sprocket connected to the axle and adapted for engaging the drive chain of a motorcycle, a brake assembly on the axle and adapted for detachable connection to the brake rod of a motorcycle, and a mounting assembly to attach the motorcycle shock absorbers to the swingarm frame.

The all-terrain attachment device attaches quickly and easily to a two-wheel motorcycle with a minimum of simple tools. The swingarm assembly and rear wheel of the motorcycle are removed and the all-terrain attachment device is connected to the motorcycle frame at the swingarm pivot bolt assembly. The motorcycle shock absorbers, drive chain, and brake pedal assembly are connected to the attachment device to convert the motorcycle to an economical three-wheel all-terrain cycle. Conversely, the all-terrain cycle device is easily and quickly dissassembled to restore the motorcycle to its original form.

An alternate embodiment is also disclosed comprising a pair of spaced-apart support members, a length adjustable support brace interposed between the support members, fasteners for detachably connecting the support members and support brace to the swingarm assembly of a two-wheel motorcycle, an axle rotatably mounted to the support members, a pair of wheels mounted to the axle, a drive sprocket connected to the axle, and a brake assembly adapted for detachable connection to the brake rod of the motorcycle. The alternate attachment device attaches to the existing swingarm of the motorcycle with the support brace providing transverse support for the spaced-apart arms of the motorcycle swingarm. The drive chain and brake pedal assembly are connected to the attachment device to convert the motorcycle to a three-wheel all-terrain cycle.

It is a principal object of this invention to provide an all-terrain motorcycle attachment device for converting a two-wheel motorcycle to a three-wheel all-terrain vehicle.

A further object of the invention is to provide an all-terrain motorcycle attachment device that attaches to and integrates with a two-wheel motorcycle.

A still further object of the invention is to provide an all-terrain motorcycle attachment device having a frame of one-piece integral construction.

A still further object of the invention is to provide an all-terrain motorcycle attachment device that is compatible with a wide variety of two-wheel motorcycles.

A still further object of the invention is to provide an all-terrain motorcycle attachment device that exhibits exceptional stability, control, traction, and overall riding characteristics.

A still further object of the invention is to provide an all-terrain cycle that is operable in snow, sand, mud and on other rough terrain.

A still further object of the invention is to provide an all-terrain motorcycle attachment device that is quickly and easily attachable to a motorcycle without the need for special tools or skills.

A still further object of the invention is to provide an all-terrain motorcycle attachment device that is economical to manufacture, durable in use, and refined in appearance.

BRIEF DESCRIPTION OF THE DRAWINGS

FIG. 1 is a perspective view of the invention attached to a motorcycle;

FIG. 2 is a top view of the invention with a portion of the motorcycle shown in phantom;

FIG. 3 is an enlarged partial side view of the invention attached to a motorcycle;

FIG. 4 is an enlarged sectional view of the brake mechanism;

FIG. 5 is a sectional view seen on line 5—5 of FIG. 3; and

FIG. 6 is an exploded perspective view of an alternate embodiment of the invention;

DESCRIPTION OF THE PREFERRED EMBODIMENT

The all-terrain motorcycle attachment device of this invention is generally designated by the numeral 10 and is shown mounted to a motorcycle 12 in FIG. 1.

Attachment device 10 generally comprises swingarm frame 14, axle 16, drive sprocket 18, brake assembly 20, and wheels 22, 24.

Swing arm frame 14 has a transversely disposed tubular member 26, a pair of spaced-apart rearwardly extending support arms 28, 30 connected at one end to tubular member 26 and extending outwardly and rearwardly therefrom, and a transverse support brace 32 rigidly connected to arms 28 and 30 (FIG. 2). Tubular member 26, support arms 28, 30 and transverse support brace 32 form a generally A-shaped frame structure for increased strength.

Support members 34 and 36 are rigidly connected to the rearward end of arms 28 and 30, respectively. Support member 36 is a plate having an elongated slot 38 and four bolt-receiving apertures 40 therethrough. As will be explained subsequently, elongated slot 38 and bolt-receiving apertures 40 permit the selective adjustable mounting of axle 16 and axle bearings 42 and 44 to swingarm frame 14.

Axle bearing 42 and axle 16 are slidably received within elongated slot 38 for attachment to support member 36. Axle bearing 42 has four elongated slots 46 to receive threaded fasteners 48. Threaded fasteners 48 extend through slots 46 and bolt-receiving apertures 40 to securely connect axle bearing 42 to support member 36. Support member 36 is of similar configuration to support member 34 and, in a similar manner, axle bearing 44 is securely attached to support member 34.

Tubular member 26 is adapted for connection to the swingarm pivot bolt assembly 50 of motorcycle 12. Swingarm pivot bolt assembly 50 generally comprises frame members 52 and 54, an elongated pivot bolt 58, and nut 60. Each frame member has a pivot bolt aperture 56 therethrough and pivot bolt 58 extends through frame member 54, tubular member 26 and frame member 52 for threaded connection to nut 60. Since the distance between frame member 52 and frame member 54 may vary with the particular model of motorcycle, spacer bushings 62 are slidably received within the ends of tubular member 26 and interposed between tubular member 26 and frame members 52 and 54 as shown in FIG. 5. By the utilization of spacer bushings 62, tubular member 26 can be adapted for connection to a wide variety of presently existing motorcycles. In this manner, swingarm 14 is pivotally attached to the swingarm pivot bolt assembly 50 of motorcycle 12.

Drive sprocket 18 is keyed to axle 16 so as to be longitudinally slidable along axle 16. Sprocket 18 has a flange 63 and stop screw 64 extends through aperture 65 of flange 63 to securely hold sprocket 18 at the desired position. Upon the attachment of swingarm frame 14 to pivot bolt assembly 50, sprocket 18 is aligned to engage drive chain 66 of motorcycle 12 as shown in FIG. 2. Axle bearings 42, 44 and axle 16 are positioned in support members 36 and 34, respectively, to provide the desired tension in chain 66. Elongated slot 38 and elongated slots 46 allow for the necessary longitudinal movement of the axle bearings and axle to adjust the chain tension. Threaded fasteners 48 securely maintain the axle bearings and axle in the selected position. Alternatively, the apertures in support members 34, 36 can be slotted for adjustability. Thus, sprocket 18 is transversely ajustable for alignment with the drive chain and the proper tension is selectively accomplished to allow compatibilty of device 10 with a wide variety of motorcycles.

Also attached to axle 16 is brake assembly 20 having an actuating lever 68 as shown in FIG. 3. Actuating lever 68 detachably connects to brake rod 70 and foot pedal 72 of motorcycle 12. Anchor brace 74 is connected between brake assembly 20 and post 76 of support arm 30. Brake assembly 20 may be either a disc brake assembly or a drum brake assembly.

A brake assembly 20 of the drum-type configuration is shown in FIG. 4 having an outer drum 78 connected to axle 16 by pin 80 for rotation therewith and inner expandable shoes 82 mounted to bearing 84. Anchor brace 74 is connected to bearing 84 to maintain bearing 84 in a more-or-less stationary position. Bearing 84 is, however, mounted for limited rotational movement to allow for the limited pivotal movement of swingarm frame 14 about pivot bolt 58. Anchor brace 74 is also pivotally mounted to post 76 and brake assembly 20. Upon depressing foot pedal 72, actuating lever 68 causes inner shoes 82 to expand in a conventional manner to brake wheels 22, 24.

Shock absorbers 86 of motorcycle 12 are detachably connected to support members 34 and 36. A plurality of fastener-receiving apertures 88 are located on the upper portion of support members 34 and 36. As can be seen in FIG. 3, the aperture of shock absorber 86 is aligned with a selected aperture 88 and securely attached to the support member by fastener 90. Since the overall length of shock absorbers vary depending on the model of motorcycle, the plurality of apertures 88 allow for selectable connection to a wide variety of shock absorbers.

To attach all-terrain cycle device 10 to motorcycle 12, the swingarm pivot bolt of motorcycle 12 is removed, shock absorbers 86 are disconnected at their lower end from the motorcycle swingarm assembly, brake rod 70 is disconnected from the motorcycle brake assembly, and chain 66 is disengaged from the motorcycle rear sprocket. The rear wheel assembly and swingarm assembly of the two-wheel motorcycle are removed.

Tubular member 26 is positioned between frame members 52 and 54 of motorcycle 12 with spacer bushings 62 providing the proper fit of tubular member 26 therebetween. Pivot bolt 58 and nut 60 connect tubular member 26 to frame members 52 and 54. Drive sprocket 18 is slidably adjusted along axle 16 into alignment with the sprocket 67 and chain 66 of motorcycle 12 and securely connected to axle 16. Chain 66 is engaged about drive sprocket 18. Axle bearings 42, 44 and axle 16 are positioned within slot 38 of support members 36 and 34, respectively. The relative distance between the forward end of swingarm 14, i.e., tubular member 26, and axle 16 is selectively determinable so as to provide the proper tension upon chain 66. On positioning axle 16 to provide the proper tension on chain 66, threaded fasteners 48 securely connect axle bearings 42 and 44 to support members 36 and 34, respectively.

Brake rod 70 is connected to actuating lever 68 to integrate the braking mechanism of motorcycle 12, i.e., foot pedal 72 and brake rod 70, to the brake assembly 20. Shock absorbers 86 are connected to support members 34 and 36 by fasteners 90.

In operation, wheels 22 and 24 are driven via sprocket 18 by the motorcycle engine. Since both wheels are being driven, superior traction is obtained on surfaces such as sand, mud and snow. Wheels 22, 24 are preferably of the underinflated balloon-type tires or knobby tires. Device 10 utilizes the shock absorbers 86 already present on motorcycle 12. The underinflated tires also function to absorb shock and produce a smoother ride.

Axle 16 is preferably 36 inches in length so that the overall width of cycle device 10 with wheels 22, 24 is approximately 44 to 48 inches to provide increased stability. The limited pivoting of swingarm frame 14 about pivot bolt 58 contributes to a smoother ride, increased stability, and improved control over the operation of the vehicle.

Accordingly, all-terrain cycle device 10 quickly and easily converts a two-wheel motorcycle to a three-wheel all-terrain vehicle. Conversion is easily accomplished with a minimum number of simple tools without special skills. Device 10 is adaptable to a wide variety of motorcycles with minor adjustments and interchangeability of parts.

An alternate embodiment of device 10 is shown in FIG. 6 and generally designated by the numeral 92. All-terrain cycle device 92 generally comprises support members 94, 96, support brace 98, fasteners 100, axle 16, drive sprocket 18, brake assembly 20 and wheels 22, 24. For the purposes of description, elements similar to device 10 have been given identical numerals.

Support member 96 is a plate member constructed of reinforced angle stock having fastener apertures 102 in the forward end and slotted fastener apertures 104 in the rearward end. Elongated slot 38 is located in the rearward end disposed between apertures 104 as shown in FIG. 6. Support member 94 is similar in construction to support member 96.

Support brace 98 is length adjustable and comprises angle member 106 having outer leg 108 and inner leg 110 and angle member 112 having outer leg 114 and inner leg 116. Outer legs 108 and 114 each contain fastener apertures 118. Inner leg 110 contains slotted fastener apertures 120 while inner leg 116 also contains fastener apertures (not shown). Fasteners 122 securely connect inner legs 110 and 116. The longitudinal orientation of slotted apertures 120 allows support brace 98 to be transversely length adjustable. It is understood that the fastener apertures of inner leg 116 can alternatively be slotted. While brace 98 is intended to attach to frame members 117 and 119, it is understood that brace 98 could alternatively be connected to support members 94 and 96.

Post 124 is rigidly connected to outer leg 114 and extends downwardly therefrom. Anchor brace 126 is connected to post 124 at one end and contains fastener aperture 128 at the other end for connection to brake assembly 20. To attach all-terrain cycle device 92 to motorcycle 12, the hub fastener of the rear wheel of motorcycle 12 is disassembled and the rear wheel removed from the swingarm assembly.

As shown in FIG. 6, frame member 117 is rigidly connected to arm 130 of motorcycle swingarm assembly 132 and frame member 119 is likewise rigidly connected to arm 134. Post 136 is rigidly connected to arm 134 with shock absorber 86 connected between post 136 and frame member 119 in a conventional manner.

To attach device 92, brace 98 is positioned between frame members 117 and 119 and adjusted to the proper length to maintain arms 130 and 134 in spaced-apart disposition. Aperture plugs 138 are placed in slots 53 of frame members 117 and 119. Support members 94 and 96 are then interconnected with frame members 117 and 119 and brace 98 by means of fasteners 100 extending through apertures 102, apertures 139 of plugs 138, apertures 118 of brace 98 to connect to nuts 142.

In a manner similar to device 10, the relative position of axle 16 with respect to pivot bolt 58 is adjusted to obtain the proper tension on chain 66. Brake assembly 20 is connected to brake rod 74.

Accordingly, all-terrain cycle device 92 utilizes the existing swingarm assembly 132 of motorcycle 12 and converts motorcycle 12 to a three-wheel all-terrain vehicle. As in device 10, assembly and disassembly is easily accomplished with a minimum number of simple tools and without the requirement of special skills.

Thus, it can be seen that the all-terrain cycle devices as disclosed can quickly and easily convert a two-wheel motorcycle to an all-terrain vehicle and thereby accomplish at least all of the stated objectives.

What we claim is:

1. An all-terrain motorcycle attachment device comprising:
    a swingarm frame having forward and rearward ends, said forward end being adapted for detachable connection to the swingarm pivot bolt assembly of a motorcycle,
    said rearward end of said swingarm frame having a pair of spaced apart support members,
    an axle rotatably mounted to said support members,
    a pair of wheels mounted to said axle,
    a drive sprocket connected to said axle,
    means for braking said wheels, said braking means being connected to said axle and adapted for detachable connection to the brake rod of a motorcycle, and
    means for detachably connecting said swingarm frame to the rear shock absorber means of a motorcycle, said swingarm frame comprising
    a transversely disposed tubular member to receive the swingarm pivot bolt of a motorcycle at said forward end, and
    a pair of spaced apart rearwardly extending support arms, said arms being connected at one end to said transverse tubular member and each said arm being connected at the other end to a respective support member.

2. The device of claim 1 wherein:
    said support arms extend rearwardly and outwardly from said forward end, and
    a transverse support brace connects said rearwardly extending support arms to form a generally A-shaped swingarm frame.

3. The device of claim 2 wherein said swingarm frame is of rigid one-piece construction.

4. The device of claim 1 wherein:
    said transversely disposed tubular member has opposite ends and a spacer bushing is slidably received within each end of said tubular member.

5. The device of claim 1 wherein:
    said axle has spaced-apart axle bearings; and
    each said support member comprises a plate with said axle bearings being mounted to said plates.

6. The device of claim 5 wherein said means for detachably connecting said swingarm frame to the rear shock absorber means comprises each said plate containing a plurality of bolt-receiving apertures.

7. The device of claim 5 wherein said axle bearings are slidably adjustably mounted to said plates.

8. The device of claim 1 further comprising:
    means for selectively varying the distance between said forward end of said swingarm frame and said axle.

9. The device of claim 8 wherein said means for selectively varying comprises:
    each said support member having an elongated slot disposed in a forward-rearward orientation with said slots slidably receiving said axle.

10. The device of claim 1 wherein said means for detachably connecting comprises means for selectively varying the position of attachment of the shock absorber means to said swingarm frame.

11. The device of claim 10 wherein said means for selectively varying comprises a plurality of bolt-receiving apertures in said swingarm frame.

12. The device of claim 1 further comprising:
    means for selectively varying the position of said drive sprocket along said axle.

13. The device of claim 12 wherein:
    said drive sprocket is keyed to said axle and slidably mounted along said axle, and
    disengagable stop means securely maintain said drive sprocket at a selected position on said axle.

14. The device of claim 13 wherein said drive sprocket has a flange with an aperture therethrough and a threaded fastener extends through said aperture to engage said axle.

15. The device of claim 1 wherein said means for braking said wheels comprises a drum brake connected to said axle.

16. The device of claim 15 wherein said drum brake comprises:

an outer drum connected to said axle for rotation therewith, a brake bearing mounted to said axle, inner expandable brake shoes mounted to said brake bearing, a brake anchor brace connected to said brake bearing and said swingarm frame, and a lever attached to said shoes to actuate said shoes against said drum, said lever being adapted for connection to the brake rod of a motorcycle.

17. The device of claim 16 wherein said brake anchor brace is movably mounted between said brake bearing and said swingarm frame to allow limited pivotal movement of said brake bearing.

18. The device of claim 17 wherein said brake anchor brace is pivotally mounted to said swingarm frame and pivotally mounted to said brake bearing.

19. The device of claim 1 wherein said means for braking said wheels comprises a disc brake connected to said axle.

20. The device of claim 1 wherein said wheels comprise all-terrain-type tires.

21. The device of claim 1 wherein said wheels comprise low pressure balloon tires.

22. An all-terrain motorcycle attachment device comprising:

first and second spaced-apart support members, a support brace interposed between said support members, said support brace and said support members adapted for detachable connection to the rearward portion of the swingarm assembly of a motorcycle, means for detachably connecting said support members and said support brace to the swingarm assembly of a motorcycle, an axle rotatably mounted to said support members, a pair of wheels mounted to said axle, a drive sprocket connected to said axle, and means for braking said wheels, said braking means being connected to said axle and adapted for detachable connection to the brake rod of a motorcycle.

23. The device of claim 22 wherein:

said first support member is a plate element having means for attachment of axle bearings, and said second support member is a plate element having means for attachment of axle bearings, said first support member being adapted for attachment to one arm of the swingarm of a motorcycle and said second support member being adapted for attachment to the other arm of the swingarm.

24. The device of claim 22 wherein:

said support brace comprises first and second ends, said first end being adapted for attachment to one arm of the swingarm of a motorcycle and said second end being adapted for attachment to the other arm of the swingarm, and said means for detachably connecting comprises means for detachably connecting said first support member and said first end of said support brace to said one arm and said second support member and said second end of said support brace to said other arm.

25. The device of claim 22 wherein:

said first and second support members each comprise a plate element having a forward end and a rearward end, said forward end having a plurality of fastener apertures therethrough, said rearward end having an elongated slot therein to receive said axle, and said means for detachably connecting comprises fasteners to extend through said fastener apertures of said plate elements and through the respective slots of the swingarm assembly of a motorcycle.

26. The device of claim 25 wherein said support brace has opposite ends, each said end having fastener apertures therethrough with said fasteners also extending through the respective apertures of said support brace.

27. The device of claim 22 wherein said support brace is a length adjustable support member.

28. The device of claim 22 wherein said support brace comprises first and second portions, said first portion being rigidly selectively connected to said second portion.

29. The device of claim 22 wherein said support brace comprises:

a first angle member having an outer leg and an inner leg, said outer leg having first fastener apertures therethrough, said inner leg having second fastener apertures therethrough, a second angle member having an outer leg and an inner leg, said outer leg having fastener apertures therethrough, said inner leg having slotted openings therethrough, and means for fastening said inner leg of said first angle member to said inner leg of said second angle member.

* * * * *